United States Patent [19]
Ortel et al.

[11] Patent Number: 5,764,754
[45] Date of Patent: Jun. 9, 1998

[54] SUBSCRIBER LOOP RECONNECTION DEVICE AND METHOD

[76] Inventors: William G. Ortel, 125 Washington Pl., New York, N.Y. 10014; John David Beierle, 12 Boulevard Dr., Apartment 121, Danbury, Conn. 06810

[21] Appl. No.: 362,613

[22] Filed: Dec. 22, 1994

[51] Int. Cl.$^6$ .................................................. H04M 7/00
[52] U.S. Cl. ........................................ 379/399; 379/333
[58] Field of Search .................................. 379/2, 29, 27, 379/6, 333, 334, 335, 336, 399

[56] References Cited

U.S. PATENT DOCUMENTS

| | | | |
|---|---|---|---|
| 4,533,914 | 8/1985 | Norling et al. | 340/825.79 |
| 4,833,708 | 5/1989 | Goodrich | 379/327 |
| 5,187,733 | 2/1993 | Beffel et al. | 379/10 |
| 5,371,786 | 12/1994 | Paul | 379/392 |
| 5,500,753 | 3/1996 | Sutherland | 359/125 |
| 5,544,197 | 8/1996 | Baumgartner et al. | 375/257 |

Primary Examiner—Krista M. Zele
Assistant Examiner—Daniel S. Hunter
Attorney, Agent, or Firm—John J. Torrente; Loren C. Swingle

[57] ABSTRACT

A cutover or reconnection LRD device capable of being remotely controlled has been developed. The cutover or reconnection device consists of a switch under control of a control circuit which can receive tone or other special signals sent remotely, such as via the network from the central office, or via portable devices. In response to those signals, the control circuit changes the state of the switch, thus connecting the subscriber to either the old electric telephone circuit, or the new network circuit. In the below-described preferred embodiments, the latter circuit may be a fiber optic circuit or a broadband or CATV circuit, for example.

15 Claims, 6 Drawing Sheets

SUBSCRIBER LOOP RECONNECTION DEVICE AND METHOD

BACKGROUND OF THE INVENTION

Telephone companies are expected to replace many of their all-metallic subscriber loops with systems in which a number of subscribers share transmission paths that are multiplexed on an optical or RF carrier. To reconnect a number of subscribers to a new multiplexed system, some tasks are performed at the central office. Here, it is convenient to prepare for reconnection ahead of time by physically attaching the multiplexed system to the switch. Then, a software change in the switch can be introduced quickly and efficiently to make the reconnection effective.

The process of reconnecting a number of subscribers quickly in this way is termed a "flash cutover". Besides using, the time of the central office technicians efficiently, a flash cutover is less confusing to customers and telephone company personnel than an extended reconnection period during, which the actual reconnection status of any one customer may not be apparent. The possibility of making a flash cutover conveniently through software changes is one of the potential advantages of the new multiplexed systems. However, this advantage is frustrated by the inefficiencies of performing the many changes required at remote locations and coordinating these changes with the central office tasks.

In the new systems, there still is a two-wire metallic connection to a telephone, but the metallic portion of the loop does not extend all the way to the central office. Instead, the metallic loop terminates at an intermediate multiplexing point. Between this point and the central office, the physical communications medium is an optical fiber or a broadband coaxial cable or both in combination. In a fiber-optic system, the equipment at the multiplexing point is sometimes called an Optical Network Unit, or ONU. In the system that is described by the U.S. Pat. Nos. 5,263,021 and 5,351,234, it has been called a Subscriber-Cable Interface Unit, or SCIU for broadband/coax applications. ONU's and SCIU's are naturally located remotely from a central office. (As a point of nomenclature, "SCIU" is a term indicating a broadband electrical device that usually serves a few subscribers, but can be expanded to many, while an "ONU" is for use in a so-called "Fiber in the Loop"(FITL) system, and usually serves many subscribers but can also serve just a few.) Thus, the task of reconnecting a number of subscribers to a multiplexed system has heretofore required a rather extensive period of time during which a technician travels to a number of remote locations.

To improve on this current practice the invention provides equipment that prepares for cutover and reconnection. That equipment, here called a Loop Reconnection Device ("LRD"), is installed temporarily for cutover or reconnection of each subscriber at remote multiplexing sites. This installation can take place over a period of time that is determined by the convenience and efficiency of deploying outside plant technicians. After all subscriber loops are equipped, the LRD's are activated by remote control, such as from the central office, at a time that is coordinated with the central office changes. Activation of an LRD causes its subscriber loop to be reconnected. The LRD can be switched back and forth between its activated and deactivated states if necessary for testing or troubleshooting. After all loops have been reconnected satisfactorily and all LRD's activated, outside plant technicians are deployed to remove the LRD's, leaving all loops reconnected. The invention would also be useful in deployment of both fiber-optic loop systems and CATV loop systems such as that described in the identified U.S. Patents or other broadband networks.

OBJECTS OF THE INVENTION

To effectively perform reconnection of a subscriber to new network circuit facilities, a cutover or reconnection LRD device of the invention has been made in accordance with the following objects:

- to remotely effect alternate connection of a subscriber to a preexisting circuit or to a new circuit to be substituted for a preexisting circuit;
- to allow for the remote control of such connections;
- to allow remote control of such connections from a central office in the telephone network or from portable devices;
- to automatically effect either individual or batch cutover or reconnection of subscribers from a prior circuit to a new circuit;
- to improve the efficient use of technical manpower in effecting such cutover or reconnections.

SUMMARY OF THE INVENTION

With the above considerations and objects in mind, a cutover or reconnection LRD device capable of being remotely controlled has been developed. The cutover or reconnection device consists of a switch under control of a control circuit which can receive tone or other special signals sent remotely, such as via the network from the central office, or via portable devices. In response to those signals, the control circuit changes the state of the switch, thus connecting the subscriber to either the old electric telephone circuit, or the new network circuit. In the below-described preferred embodiments, the latter circuit may be a fiber optic circuit or a broadband or CATV circuit, for example.

BRIEF DESCRIPTION OF THE DRAWINGS

The following description of preferred embodiments will be with reference to the appended FIGS. in which.

DESCRIPTION OF PREFERRED EMBODIMENTS

Figure 1:
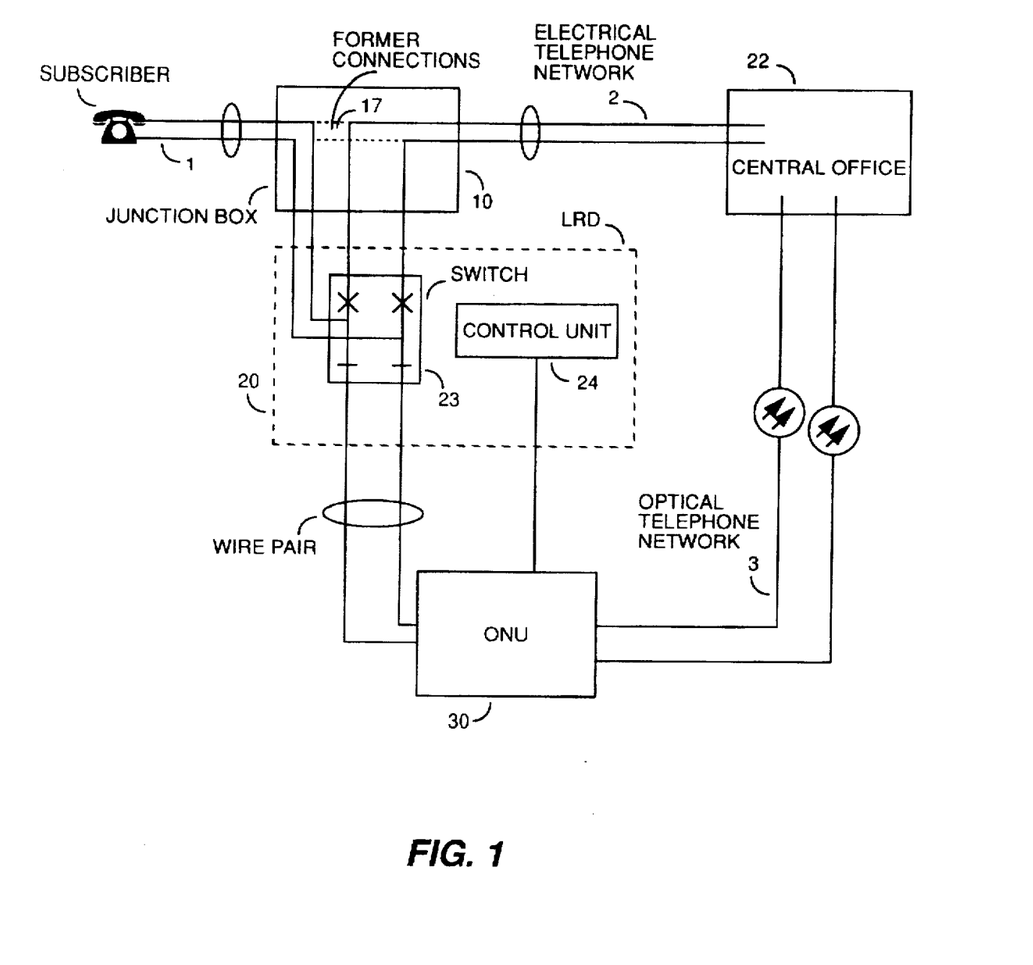
FIG. 1 illustrates the use of the LRD device for cutover from a preexisting electric circuit in the network to a fiber optic based circuit.

In a preferred embodiment, using a cutover to an optical circuit as an example, and as shown in the appended FIG. 1, the cutover or reconnection device 20 is interposed between a junction box 10—already in place in the preexisting electrical telephone network 2—used for connecting the subscriber line 1 to the central office 22, and the optical network unit (ONU) 30, which is the optical to electric interface for the new fiber network 3. Ideally, as will be shown below, the cutover or reconnection device 20 may be designed as a modular plug-in accessory as to the ONU 30 or to a cross-connect field array. As part of the setup to provide for the flash cutover or reconnection via the cutover or reconnection device 20, a technician will have rerouted some of the former connections 17 in the junction box 10 in the manner shown to provide for circuit interconnection via the switch in the cutover or reconnection device 10.

As can be seen, in this particular example, the cutover or reconnection device 20 employs a double pole double throw switch 23 providing alternative connection pairs for connecting the subscriber, via the electrical twisted pair dropline of subscriber line 1 either to the electric circuit 2 or to the ONU 30 of the optical fiber based circuit 3. In the LRD device 20, the switch 23 may be solenoid actuated, and the state of the switch—by changing the solenoid—can be controlled remotely by providing a control circuit 24 configured to respond to designated tones sent over the optical circuit 3 from the central office or by a technician's portable device, such that receipt of a specific tone causes the control circuit 24 to change the state of the switch 23, by actuating the solenoid. While cutover of an individual subscriber can be effected by sending to that subscriber LRD 20 the special signal over its line, it may also be possible to design the control circuits 24 to provide each such device 20 with a unique tone or address such that individual subscriber circuits can be cut over on an individual or selective basis. It is also equally possible to configure the LRD installation to allow the special signal to be sent over the electrical circuit 2.

Additionally, the control circuit 24 can be designed to also respond to more general or universal signals as well, and mass or batch cutover or reconnection can be thus achieved. The use of special signals and tones to effect remote control of telephone network apparatus either from the central office or from technician's portable gear is well known and these techniques per se need not be discussed here as they in themselves are not considered part of the invention. Also, while FIG. 1 shows that the special signals would be provided over the new fiber network 3, it is possible to configure the system to effect cutover via signals sent via the electrical network 2, or both. The invention is also applicable to systems in which subscriber loop channels are multiplexed over CATV type coaxial cable, such as described in the previously noted patents.

One way the cutover or reconnection device's control circuit 24 may be implemented is by a series-resonant circuit in series with the solenoid, such that a signal at the resonant frequency will cause the coil to operate. A circuit of this type may be made using the stray inductance of the solenoid. The solenoid may be a relay of the latching type, so that it would operate to open or close the contacts of switch 23 in response to pulses of the special tone or signal. It may be configured to require pulses of a predetermined number and/or duration. Alternatively, an electronic circuit to perform these functions, having suitable logic, is readily implementable.

As previously mentioned, the connections in the junction box 10 must be altered to effect connection via the switch 23; this is done by changing the preexisting arrangement of the jumpers in the junction box 10. Once permanent cutover or reconnection has occurred, the junction box can be later reconfigured to remove the connections to the cutover or reconnection device 20 and install permanent jumpers to the ONU 30.

The cutover or reconnection device 20 can be switched to either state for test purposes without requiring technician visits to the junction box 10. In this way the technician work force can be more efficiently and effectively employed.

The cutover or reconnection device can of course be used in any intermediate point in the existing loop where there is access at a junction box. It could also be used at a new terminal that may be introduced to suit new multiplexed loop systems, e.g. coaxial or optical facilities, as shown in FIG. 2.

Figure 2:
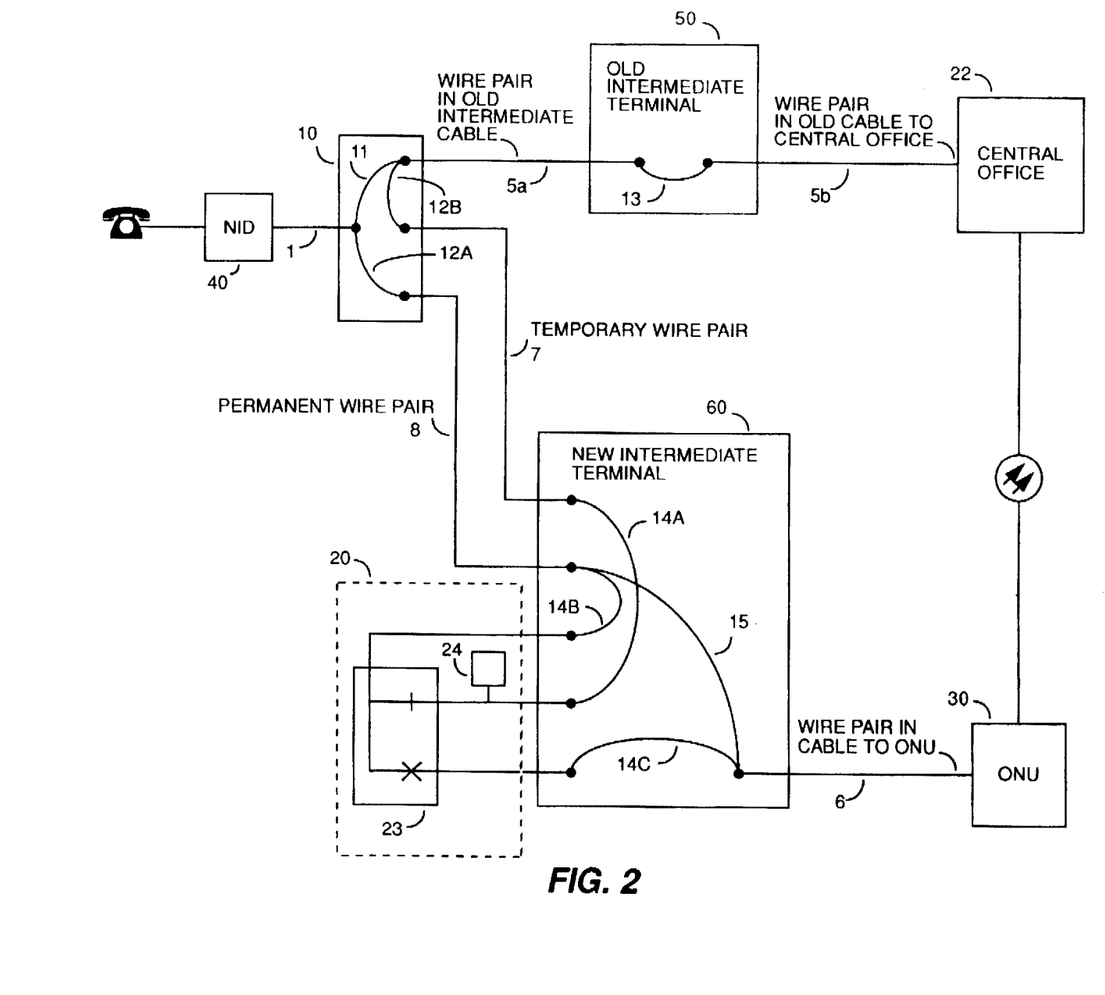
FIG. 2 illustrates the use of the LRD devices for cutovers at a new intermediate terminal used in association with the new circuit.

Referring now to that FIG. 2, in such systems, the subscriber line 1 has an network interface device 40 (providing a demarcation point between the subscriber equipment and the telephone company's network) between the subscriber and the junction box 10. For cutover or reconnection in such multiplexed systems, there may be an old intermediate terminal 50 connecting old intermediate cable 5a and the old wire pair 5b to the central office 22. There may also be a prospective new intermediate terminal 60 connected to the central office 22 by a new cable 6. If the new circuit is an optical one there will be an ONU 30 between terminal 60 and the central office 22. If the system is a broadband or a cable system, instead of the ONU there will be an SCIU between terminal 60 and the central office 22. As shown in FIG. 2, the cutover or reconnection can be effected by use of a cutover or reconnection device 20 in accordance with the present invention, connected to the intermediate terminal 60. However, in this configuration, installation via junction box 10 involves a new multipair cable with a permanent wire pair 8 and a temporary wire pair 7.

At the first step, junction box 10's preexisting jumper 11 is removed, but 13 is left in place in the old intermediate terminal 50. Jumpers 12A and 12B in junction box 10 and 14A, 14B and 14C in the new intermediate terminal 60 are installed. After cutover, jumper 15 is installed, and jumper 12A is left in place, while the device 20, as well as jumpers 12B, 14A, 14B and 14C are removed at respectively junction box 10 and at the new intermediate terminal 60. At such time, the old intermediate cable 5a, the old cable to the central office 5b and the old intermediate terminal 50 can also be then removed. Again, the configuration of FIG. 2 is but one example of the employment of the invention, and the cutover or reconnection device 20 could be located elsewhere, such as at the old terminal 50.

Figure 3A:
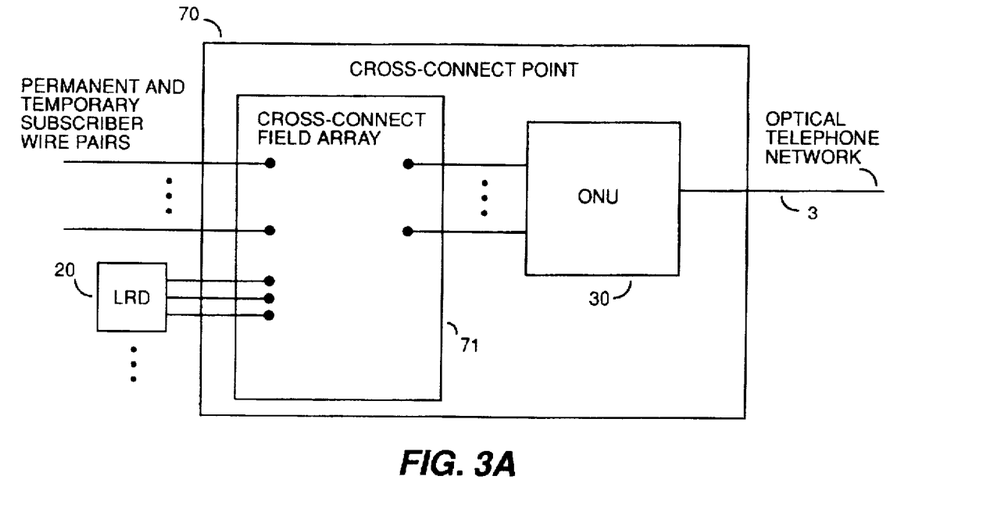
FIGS. 3A, 3B and 3C illustrate the use of the LRD devices in a cross-connect field array.
Figure 3B:
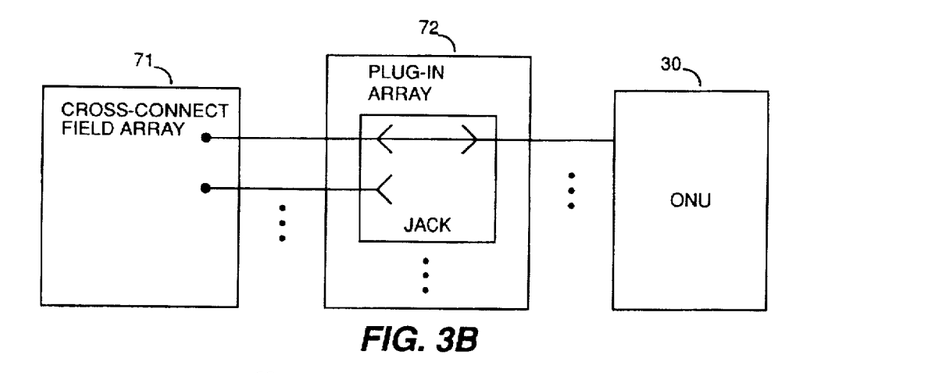
Figure 3C:
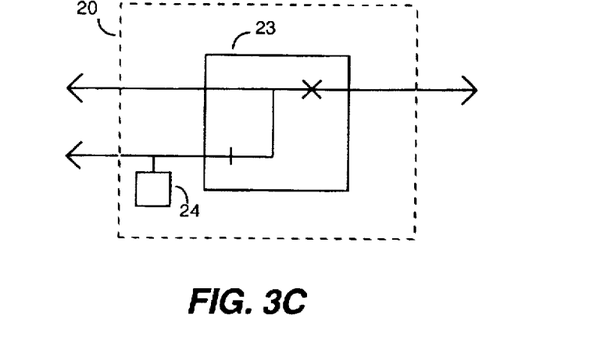

To show another example, in the configuration of FIG. 3A, the cables of FIG. 2 could be brought to a cross-connect point 70. At that cross-connect point 70 an ONU 30 is provided to interface groups of subscriber lines to the optical portion of the network. The ONU 30 is shown as having multiple connections to the cross-connect field array 71, so that the ONU output can be connected to the subscribers via that array 71. The cross-connect array 71 may be provided in a common housing with the multichannel ONU 30. This is shown in FIG. 3A. In FIG. 3A, the LRD's 20 are shown as connected by wires or jumpers to array 71. However, in such an arrangement, it would be advantageous to place the cutover or reconnection devices 20 as plug-in units between the array 71 and the ONU 30. This improvement is shown in FIG. 3B and would require a plug-in array 72 providing jacks and which would be intermediate between ONU 30 and field array 71. In this case the devices 20 can be configured as shown in FIG. 3C.

Figure 4A:
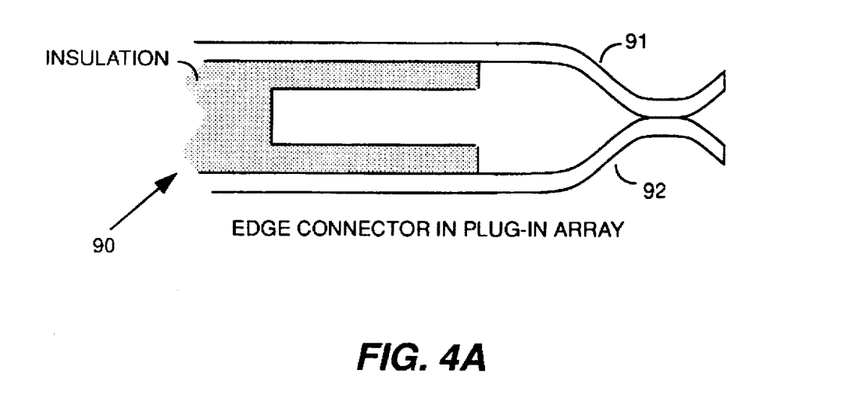
FIGS. 4A and 4B illustrate construction details enabling the ready use of the LRD devices with existing telephone network equipment.
Figure 4B:
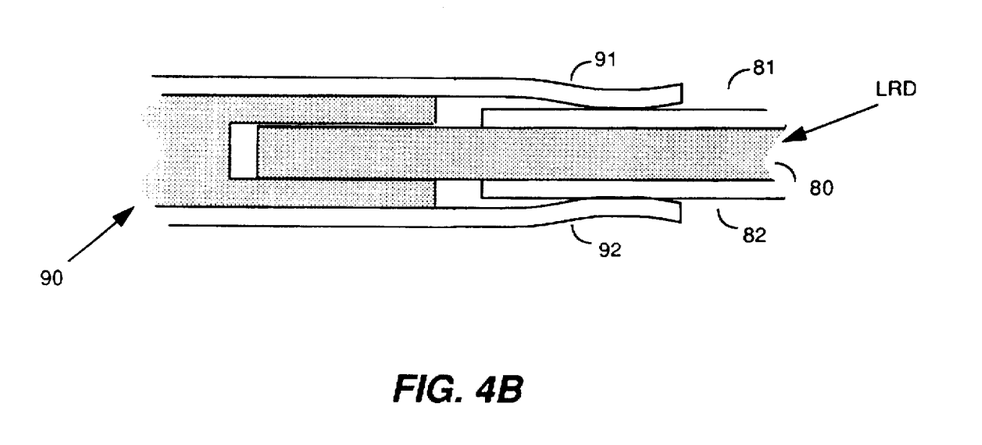

The more detailed construction of the plug-in arrangement is shown in FIGS. 4A and 4B. Those Figures illustrate the LRD 20 as constructed as a two-sided printed circuit board or card 80 with contacts 81 and 82 along one side that fit into an edge connector 90 of the plug in array 72. The connector 90 has spring contacts 91, 92 that are closed when the connector is empty, but pushed apart when the card 80 is plugged in. Additionally, connections in the ONU can be constructed similarly to that of the array 72 in FIG. 3B to make the LRD 20 modular to the ONU.

Figure 5A:
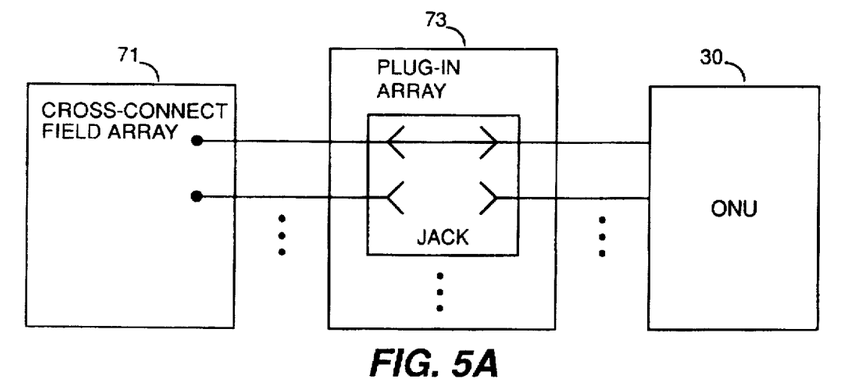
FIGS. 5A and 5B illustrate an arrangement whereby the LRD's may receive control signals via the ONU instead of the wire pair to the central office.
Figure 5B:
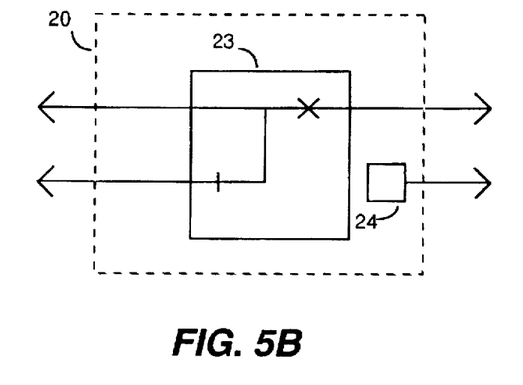

When the devices 20 are associated with an ONU such as that shown in FIGS. 3A and 3B, the control circuit 24 in each device can receive the special control signals via that ONU instead of the wire pair to the central office. Schematically, this is as shown in FIGS. 5A and 5B. As shown there, the electrical configuration of the plug-in array 73 is slightly different from that of array 72. Also, the electrical configuration of device 20 in FIG. 5B is altered to allow control of its operation from signals transmitted via ONU 30. The control signal could be multiplexed on the optical transmission link from the central office using known techniques.

Figure 6:
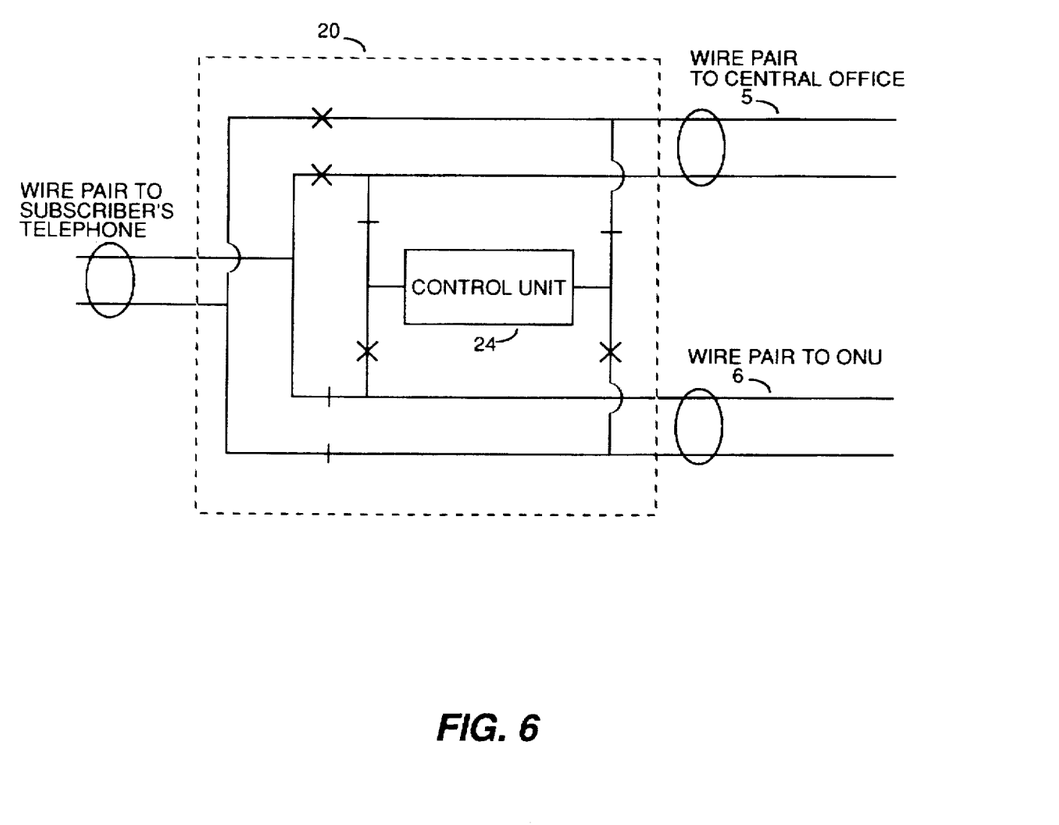
FIG. 6 illustrates an arrangement for controlling the operation of the LRD via either the preexisting or the new circuits.

A further mode of employment of the invention is shown in FIG. 6. In that FIG., rather than undertaking to provide the special control signals in the network itself, such as an in-band tone signal, the cutover or reconnection device 20 may be configured to receive the control signals on a circuit, such as a wire pair, not being used for voice transmission. With the switch contacts in the condition shown in FIG. 6, the subscriber's telephone is connected to the ONU's wire pair 6, and the control unit 24 is ready to receive a control signal via the wire pair 5. After receiving that signal, control unit 24 causes the subscriber to be connected to wire pair 5 and the connections to control unit 24 are switched to ONU's wire pair 6.

In such an arrangement, the central office will have some means of providing the control signal on the two loops to cause the switch to select the alternate circuits. Even radio signaling is feasible. This arrangement eliminates any interference between the control signals and the subscriber telephone in use, and eliminates any impairment of the path to the telephone in use because the control circuit 24 switches itself out of the communications circuit.

While having shown and described several embodiments of the invention, it will be apparent to those skilled in the art that it may be possible to vary or depart from the examples given without departing from the spirit and scope of the instant invention set forth in the claims. For example, while the description above refers to cutover to a new fiber-based circuit in the telephone network, it will be easily seen that the invention is useful in cutovers to other systems as well, such as to newer electric circuit facilities, or to broadband networks. Further, it need not be necessary to send the special signal or tones via the new circuit, as it is equally feasible to use the old circuit for this purpose, or via other communications methods and facilities as well. Moreover, it is clear that applications beyond telephone networks may exist.

What is claimed is:

1. For a telephone network having a central office, a first circuit terminating at the central office for electrical telephonic communication between subscribers, said first circuit having junction boxes, said junction boxes allowing electrical connection between said first circuit and said subscribers, said network having drop lines from said junction boxes and terminating at each subscriber premises, said telephone network further having a second circuit between said central office and said junction boxes and providing telephonic communications between subscribers and telecommunications signals to said junction box, a cutover or reconnection device located at said junction box and having means for connecting said subscriber to either said first or said second circuit, said device further having means responsive to special signals transmitted over said first or second circuit for controlling said connection means remotely.

2. The cutover or reconnection device of claim 1 wherein said connection means for connecting comprises a solenoid and a solenoid-actuated switch providing alternative connections between said subscriber and said first circuit, and between said subscriber and said second circuit.

3. The cutover or reconnection device of claim 2 wherein said control means comprises a control circuit for receiving in —band tone special control tone signals for receipt by said control circuit from said central office circuit, and generating in response to receipt of such special tone control signals, a control signal to control via said solenoid, the position of said switch.

4. The cutover or reconnection device of claim 2 wherein said control means comprises a control circuit for receiving in —band tone special control tone signals for receipt by said control circuit from a tone imposed in said circuit remotely from said central office by a technician via a portable tone generator, and generating in response to receipt of such special tone control signals, a control signal to control by actuation of said solenoid, the position of said switch.

5. The cutover or reconnection device of claim 1 wherein said device further comprises means for connecting said means for controlling to either said first or said second circuit.

6. For a telephone network having a central office, a first circuit terminating at the central office for electrical telephonic communication between subscribers, said first circuit having junction boxes, said junction boxes allowing electrical connection between said first circuit and said subscribers, said network having drop lines from said junction boxes and terminating at the subscriber premises, said telephone network further having a second circuit between said central office and said junction boxes and providing optical telephonic communications between subscribers utilizing optical signals, and having optical to electric conversion devices for converting said optical signals to electrical telephone communication signals and providing said electrical telecommunications signals to said junction box, a cutover or reconnection device located between said conversion device and said junction box and having means for connecting said subscriber to either said first or said second circuit, said device further having means responsive to special signals transmitted over said first or second circuit for controlling said connection means remotely.

7. The cutover or reconnection device of claim 6 wherein said connection means for connecting comprises a solenoid and a solenoid-actuated switch providing alternative connections between said subscriber and said first circuit, and between said subscriber and said conversion device.

8. The cutover or reconnection device of claim 7 wherein said control means comprises a control circuit for receiving in —band tone special control tone signals for receipt by said control circuit from said central office circuit, and generating in response to receipt of such special tone control signals, a control signal to control via said solenoid, the position of said switch.

9. The cutover or reconnection device of claim 7 wherein said control means comprises a control circuit for receiving in —band tone special control tone signals for receipt by said control circuit from a tone imposed in said circuit remotely from said central office by a technician via a portable tone generator, and generating in response to receipt of such special tone control signals, a control signal to control by actuation of said solenoid, the position of said switch.

10. A method of effecting reconnection or cutover of telephone subscribers in a telephone network between a first electric telephone circuit having junction boxes for connection of the subscribers to said first circuit and a second optical telephone circuit, said first and second circuits being connected to a central office, the second circuit having optical to electrical conversion devices for converting optical telephone signals to electrical telephone signals, said method comprising:

provoding a switch for providing alternate connections between said junction box and said first circuit and said subscriber, and between said optical to electrical conversion device and said junction box and said subscribers, providing a control circuit for controlling the connection state of said switch between said alternate connections, said control circuit being responsive to receipt from the network over said first or second circuit of special signals indicative of a command to change the connection state of the switch, and remotely providing via the network the special signals.

11. The method of claim 10 wherein the step of remotely providing the special signals is by generation of said signals at the central office.

12. The method of claim 10 wherein the step of remotely providing the special signals is by generation of such signals in the network from a portable signal generator.

13. A method of effecting reconnection or cutover of telephone subscribers in a telephone network between a first electric telephone circuit having junction boxes for connection of the subscribers to said first circuit and a second telephone circuit, said first and second circuit being connected to a central office, said method comprising:

providing a switch for providing alternate connections between said junction box and said first circuit and said subscriber, and between said second circuit and said junction box and said subscribers, providing a control circuit for controlling the connection state of said switch between said alternate connections, said control circuit being responsive to receipt from the network over said first or second circuit of special signals indicative of a command to change the connection state of the switch, and remotely providing via the network the special signals.

14. The method of claim 13 wherein the step of remotely providing the special signals is by generation of said signals at the central office.

15. The method of claim 13 wherein the step of remotely providing the special signals is by generation of such signals in the network from a portable signal generator.

* * * * *